April 24, 1934.  W. BÜTOW  1,956,461
APPARATUS FOR PROTECTING ELECTRIC APPLIANCES
Filed Oct. 10, 1931  7 Sheets-Sheet 1

Inventor:
Walter Bütow,
by N. J. Schrenborn

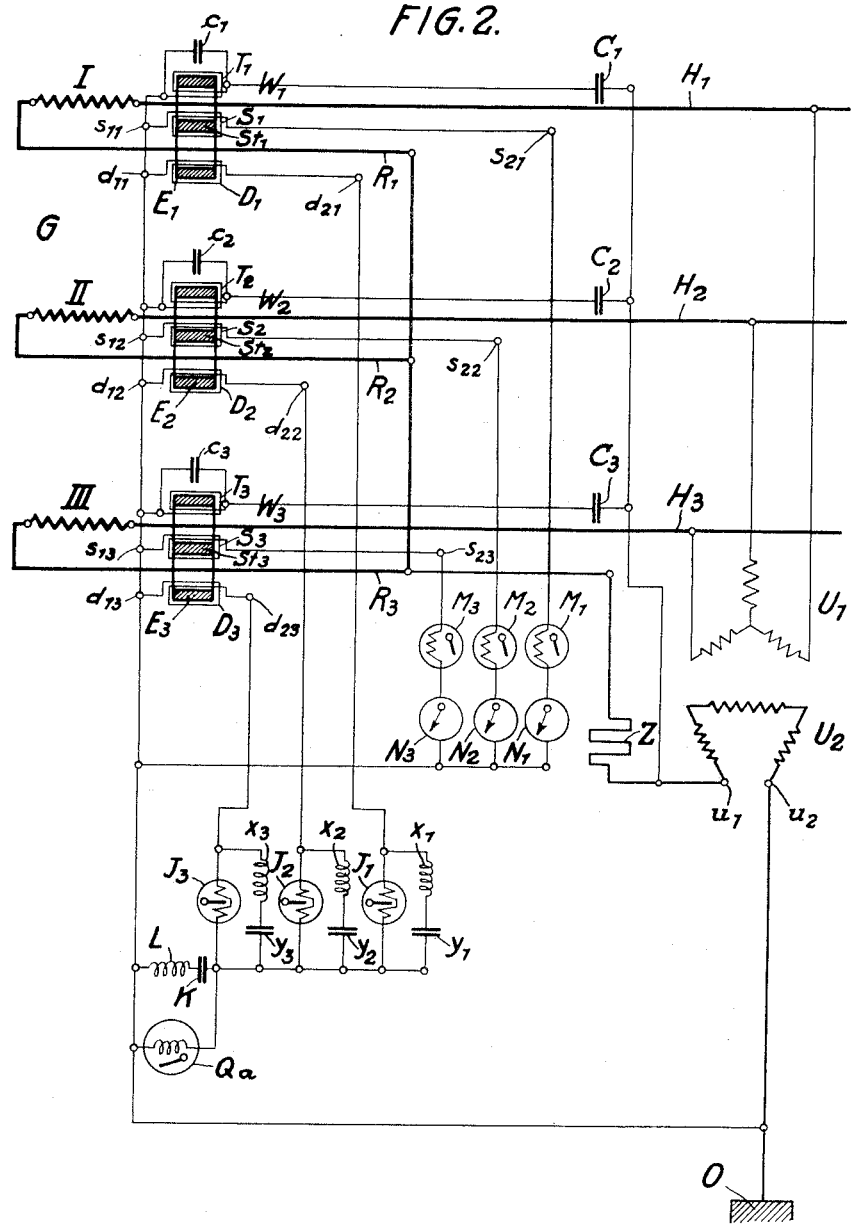

April 24, 1934. W. BÜTOW 1,956,461
APPARATUS FOR PROTECTING ELECTRIC APPLIANCES
Filed Oct. 10, 1931   7 Sheets-Sheet 6

Inventor:
Walter Bütow
by W. Schrauberr
Attorney.

Patented Apr. 24, 1934

1,956,461

UNITED STATES PATENT OFFICE 1,956,461

APPARATUS FOR PROTECTING ELECTRIC APPLIANCES

Walter Bütow, Frankfort-on-the-Main, Germany, assignor to Elektrizitats-Actien-Gesellschaft vorm. W. Lahmeyer & Co., Frankfort-on-the-Main, Germany, a company of Germany Application October 10, 1931, Serial No. 568,166 In Germany October 14, 1930

8 Claims. (Cl. 175—294)

My invention relates to electric plants having electric appliances, such as generators, machines, instruments and the like, requiring protection from irregular currents, and more particularly to plants including an integrating and differential current transformer of the type described in my prior patent of the United States, 1,866,751, July 12, 1932, for an Integrating and differential transformer. In this prior patent, I have described a transformer with a winding corresponding to the sum (integrating winding) and a winding corresponding to the difference (differential winding) of currents passing through the transformer. The integrating winding supplies a maximum, and the differential winding a differential relay. The maximum relay operates if excess current occurs due to short-circuit or overload, and the differential relay operates if trouble not due to short-circuit or overload occurs, for instance, if insulation is punctured. In addition to the two relays, an earthing relay is provided which may be amperemetric or wattmetric, the latter type being preferable on account of its sensitivity.

Protecting apparatus of the type set out are generally satisfactory but fail under certain conditions, for instance, in large systems including a triphase generator and quenching means such as Petersen coils for the compensation of earthing currents which occur in the case of puncture or short-circuit.

Quenching means generate compensating currents which are equal, but opposite, to the earthing currents to be counteracted but the compensation is only approximate and subject to over- and under-compensation if parts of the system are cut out and in, respectively. Faulty compensation results in wattless currents which cause defective operation of the earthing relay.

It is an object of my invention to eliminate trouble of this kind in a plant as described, in which the appliance to be protected, say, a monophase generator, is connected to a system with an integrating and differential transformer, and quenching means for earthing currents. To this end, I impress on the system an auxiliary current of a frequency other than the system frequency.

In the accompanying drawings, various systems and various means for generating the auxiliary current are illustrated diagrammatically by way of example.

In the drawings

Fig. 2 is a diagram showing a triphase generator, an amperemetric earthing relay, and a stationary auxiliary generator.

Fig. 6 shows short-circuiting of two system conductors in a plant with a three-phase generator, Fig. 7 shows short-circuiting of two phases in the three-phase generator, and Fig. 8 shows earthing of a generator winding.

Figure 1:
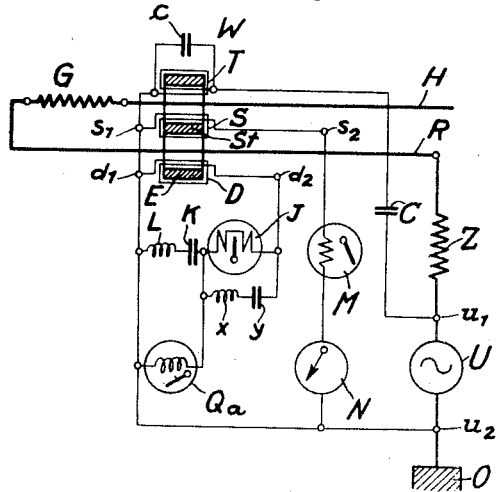
Fig. 1 is a diagram of a system having a monophase generator to be protected, an amperemetric earthing relay and a rotary auxiliary generator.

Referring now to the drawings, and first to Fig. 1, H is an inlet, and R is a return wire, and G is a monophase generator to which the wires are connected and which is to be protected. E is the laminated iron core of the integrating and differential transformer W described in my said prior patent, with a transverse bar $St$, the integrating winding S on the bar, the differential winding D on the lower arm of the yoke, and a third winding T on the upper arm. M is the maximum relay, and N is a current meter, both connected to the terminal $s2$ of the winding S, J is the minimum or differential relay, and $Qa$ is the amperemetric earthing relay, both relays being connected to the terminal $s1$ of the winding S, and to the terminal $d1$ of the winding D.

U is the rotary generator for the auxiliary current which is earthed at O, $u1$ and $u2$ are its terminals, Z is an impedance which is connected to the return wire R at one end and to $u1$ at the other, and C is a condenser which is also connected to $u1$ and to the third winding T for compensating weak currents due to the winding capacity of the monophase generator G to earth. The other terminal $u2$ of the auxiliary generator U is connected to the terminals $s1$ and $d1$ of windings S and D.

$c$ is a parallel condenser to the third winding T; L, K is a resonance circuit parallel to the earthing relay $Qa$, and $x, y$ is a resonance circuit parallel to the relay J.

In plants of the kind referred to, it is old to effect compensation by opposing to the earthing current which tends to form, an equal but oppositely directed current. The two counteracting currents are substantially wattless, that is, they are distorted for 90 degs. to the generator voltage. The problem is to keep small the residual current for this is a watt current in phase with the generator voltage. When compensating, a capacitative and an inductive current counteract each other. The inductive current is determined by the system or its parts, and generated by induction, i. e., choke coils, or transformers. If these means are adjustable it is possible to consider the various operating conditions of the system to be compensaed against earthing. But this, as mentioned, is approximate only. If a part of the system is cut out, conditions are altered as well as if a part is cut in, and over- or under-compensation will be the result.

Faulty compensation causes in addition to the said residual watt current, which should be kept small by the compensation, the setting up of a wattless current of considerable amount if earthing occurs. The wattless current causes failure of the earthing relay $Qa$ if there is an earth in the system, and also if there is trouble with the generator G.

The auxiliary current from generator U cooperates with the relay $Qa$ and the transformer W. The generator U is connected in series with the impedance Z which, as shown, is intermediate a phase conduit of the generator G or other appliance to be protected, and earth, or, if the generator or the like is multiphase as will be described, intermediate the zero point and earth.

The problem is that the auxiliary current which, as mentioned, has another frequency than the system, should act on the earthing relay $Qa$ but not on the differential relay J, or, in a multiphase generator or the like, on the plurality of the differential relays. In other words, the earthing relay should react only on the auxiliary current, and the differential relay J only on currents of the system frequency. This is effected by shunting the windings of the differential relay J and the winding of an amperemetric relay $Qa$, or the current winding of a wattmetric relay $Qw$, Fig. 3, by the resonance circuits $x$, $y$ and L, K, respectively. The circuit $x$, $y$ of the differential relay J is tuned to the frequency of the auxiliary current, and the circuit L, K of the earthing relay $Qa$ or $Qw$ is tuned to the system frequency, so that the auxiliary current will not act on the differential relay J, and the system current will not act on the earthing relay $Qa$, $Qw$ because the resonance circuit $x$, $y$ has a resistance which is low to currents from the auxiliary generator U, but very high to currents of system frequency, and, conversely, the resonance circuit L, K has very low resistance to currents of the system frequency, and a very high resistance to currents from the auxiliary generator. In other words, the earthing relay $Qa$ or $Qw$, as the case may be, responds only to currents of other than the system frequency, while the differential relay, or relays, J, responds only to currents of system frequency. The quenching means in the system render earths of the conductors H, R practically harmless so that extra means for protection against such earths are not required. However, there are still three other possibilities of trouble, as follows:

1. Short-circuiting of two system conductors;
2. Short-circuiting between two winding of different phases in the applicance to be protected (generator G);
3. Earthing of a winding of the appliance.

The three cases are indicated in different ways, and the earthing relay $Qa$ or $Qw$ responds only in case (3), as will be described with reference to Fig. 4.

Figure 3:
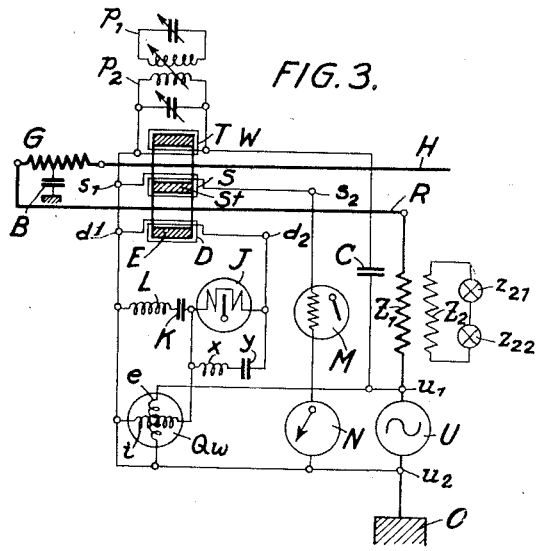
Fig. 3 is a diagram similar to Fig. 1 but with a wattmetric earthing relay.

The integrating and differential transformer W, as described in my said prior patent, may be used for all connections of this kind. If it is desired to obtain particularly high sensitivity in a protecting apparatus of the type described, the third winding T is provided and a capacitative current, that is, a current leading its generator voltage, caused to flow in it. To this end, the condenser $c$ is connected in parallel to the terminals of the winding T. However, as shown in Fig. 3, the condenser may be replaced by an adjustable oscillation circuit, or preferably two coupled resonance circuits $p1$, $p2$ which may be tuned so as to amplify only the currents required for measuring.

The condenser C is preferably provided with very sensitive protecting apparatus for compensating the influence of the earth capacity of the generator G or other machine. Instead of the condenser I may provide a system of conductors, normally a capacitative oscillation circuit, not shown, which condenser or other unit may be connected to the third winding T, as shown, or to the differential winding D, or to a fourth winding, not shown, of the transformer W. Compensation of earth capacity is required in sensitive protecting apparatus because the earth capacity causes unequal loading of the transformer by the auxiliary current which must be prevented as such an unequal or unsymmetric loading must occur only if there is an earth in the appliance to be protected.

The frequency of the auxiliary current should be appreciably different from the system frequency which in the U. S. is normally 60 periods per second. It may be higher or lower than the normal frequency, say 100 periods per second, 150 periods per second, 9000 periods per second, etc., but it may also be 25 periods per second or even less. For practical reasons, however, the frequency of the auxiliary current should be higher than that of the system. Preferably the frequency of the auxiliary current is an undivided multiple of the system frequency, as such frequencies can be generated in a very simple manner because only stationary frequency transformers are required as generators for the auxiliary current, as will be described. Such stationary transformers may be supplied from the generator or the like which is to be protected, or from its system. Normally, medium frequency generators such as U in Figs. 1 and 3 are provided.

Referring to Fig. 2, this shows a triphase generator G, I, II, III, with three inlet wires H1, H2, H3, and three return wires R1, R2, R3, and three transformers W1, W2, W3, each with windings T1, S1, D1, etc. The terminals of the three differential windings D1, D2, D3 are $d11$, $d21$, $d12$, $d22$, and $d13$, $d23$. The terminals of the integrating windings S1, S2, S3 are marked similarly. The relays M and J, and the meter N, are subdivided as shown. $c1$, $c2$, $c3$, and C1, C2, C3 are condensers.

The stationary transformer, with its primary U1 and its secondary U2, supplies auxiliary current at three times the system frequency. The primary U1 is connected in star with the ends of its coils connected to the three wires H, and the secondary U2 is an open triangle, with the terminal $u1$ connected to an ohmic resistance Z, and the terminal $u2$ to earth at O. $Qa$ is the amperemetric earth relay.

Fig. 3 has already partly been described. It is substantially similar to Fig. 1 but shows a wattmetric relay Qw with the current winding $i$ and he voltage winding $e$. The impedance Z, Fig. 1, has been replaced by a voltage transformer, with the primary Z1 and the secondary Z2, and loading resistances $z21$, $z22$. B is a winding capacity from the monophase generator G to earth.

Figure 4:
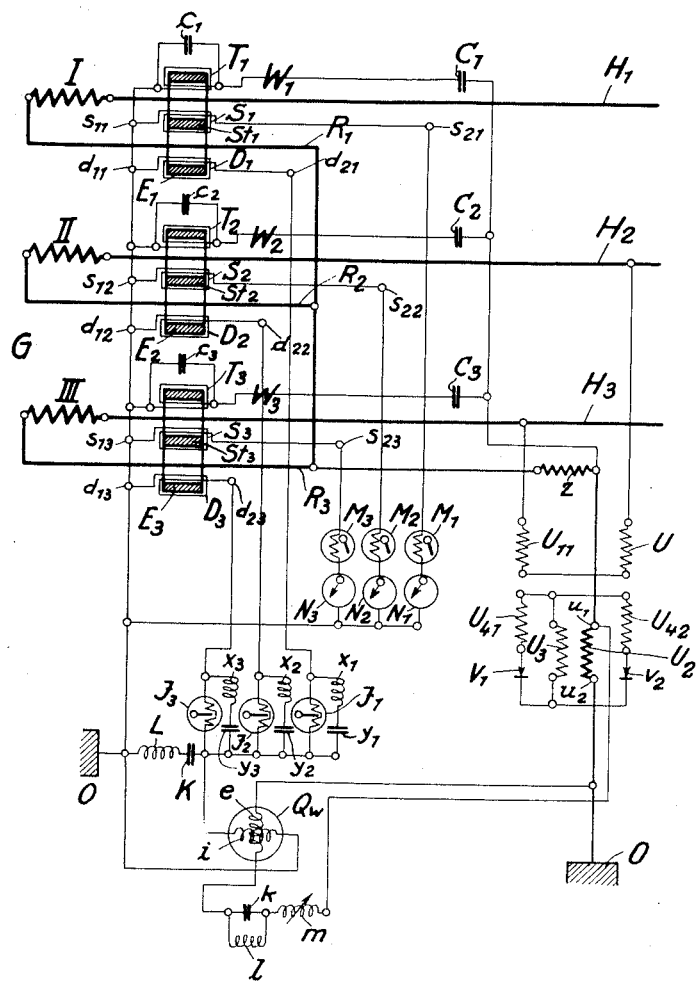
Fig. 4 is a diagram similar to Fig. 2, with a modified auxiliary generator and a wattmetric earthing relay.

Referring to Fig. 4, this system is similar to that in Fig. 2, but has a wattmetric earth relay Qw and a modified transformer or auxiliary current-generator. Z is a zero-point impedance which may be a resistance or coil. The primaries U11 and U12 of the transformer or generator are connected to the wires H3 and H2, respectively. U2 is the current-supplying secondary, with the terminals $u1$ and $u2$, and U3 is a third winding, in parallel to two windings U41 and U42, with series rectification valves $v1$, $v2$. Current of twice the normal system frequency is taken from $u1$ and $u2$. $l$ is a coil, $k$ a condenser, and $m$ is a choke coil for regulating the phase position of the current in the voltage coil $e$ of the relay Qw.

If an earth occurs, for instance, at III, currrent of other than system frequency flows from $u1$ to $u2$ through Z, R3, a portion of III, and earth. The transformer W3 is unsymmetrically loaded by this current and electromotive force is generated in differential winding D3. This force causes current to flow from D3 to earth through resonance circuit $x3$, $y3$ and coil $i$ of relay Qw, and the relay Qw now responds because both its coils are excited. The maximum relays M and the differential relays J do not respond.

Figure 5:
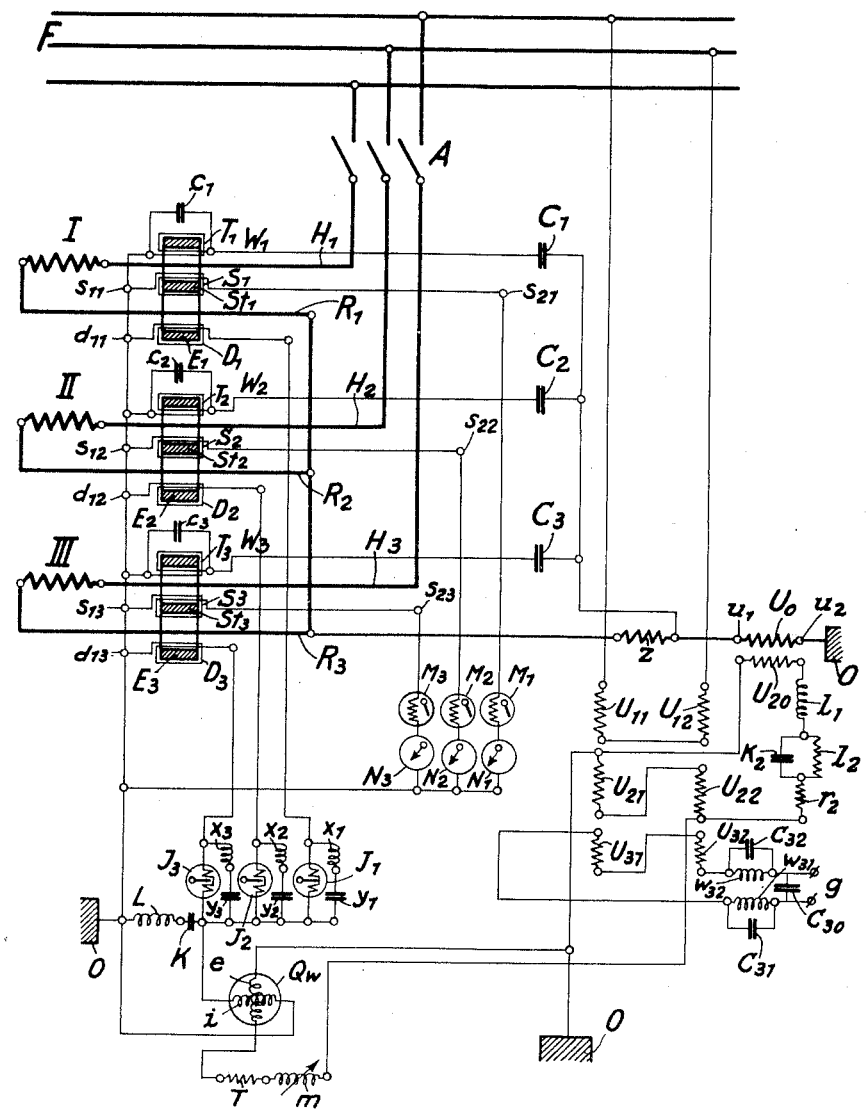
Fig. 5 is a diagram similar to Fig. 4, with another modified auxiliary generator and a switch between the triphase generator and the line wires.

Referring to Fig. 5, this system is similar to that in Fig. 4 but the system is connected to the wires F by switches A, and the transformer or generator for the auxiliary current has again been modified. Uo and U20 are the secondary and primary of a transformer, with the terminals $u1$ and $u2$ at Uo. U21 and U22 are the secondaries of a stationary frequency transformer from which the primary U20 is supplied. The primaries U11 and U12 of this latter transformer are connected to the line wires F. The auxiliary windings U31 and U32 of the frequency transformer are supplied with direct current from any suitable source $g$. The auxiliary current has twice the frequency of the system, and the oscillation circuits from $w31$ and $c31$, and $w32$ and $c32$, respectively, are tuned to the same frequency.

$c30$ is a protective condenser for the source $g$ of direct current. $r2$ is a limiting resistance in one of the wires to the primary U20. $k2$ is a capacity, $l2$ an induction coil, and $l1$ is a choke coil which are inserted between $r2$ and U20. $k2$ and $l2$ are so determined that the proper frequency of the resonance circuit $k2$, $l2$ is equal to that of the line wires F. The choke coil $l1$ is so determined that, together with the resonance circuit $k2$, $l2$ it has twice the frequency of the wires F.

The coil $l$ and the condenser $k$ at the relay Qw are here replaced by a resistance $r$.

Troubles Nos. (1) to (3) will now be described with reference to Figs. 6 to 8.

Figure 6:
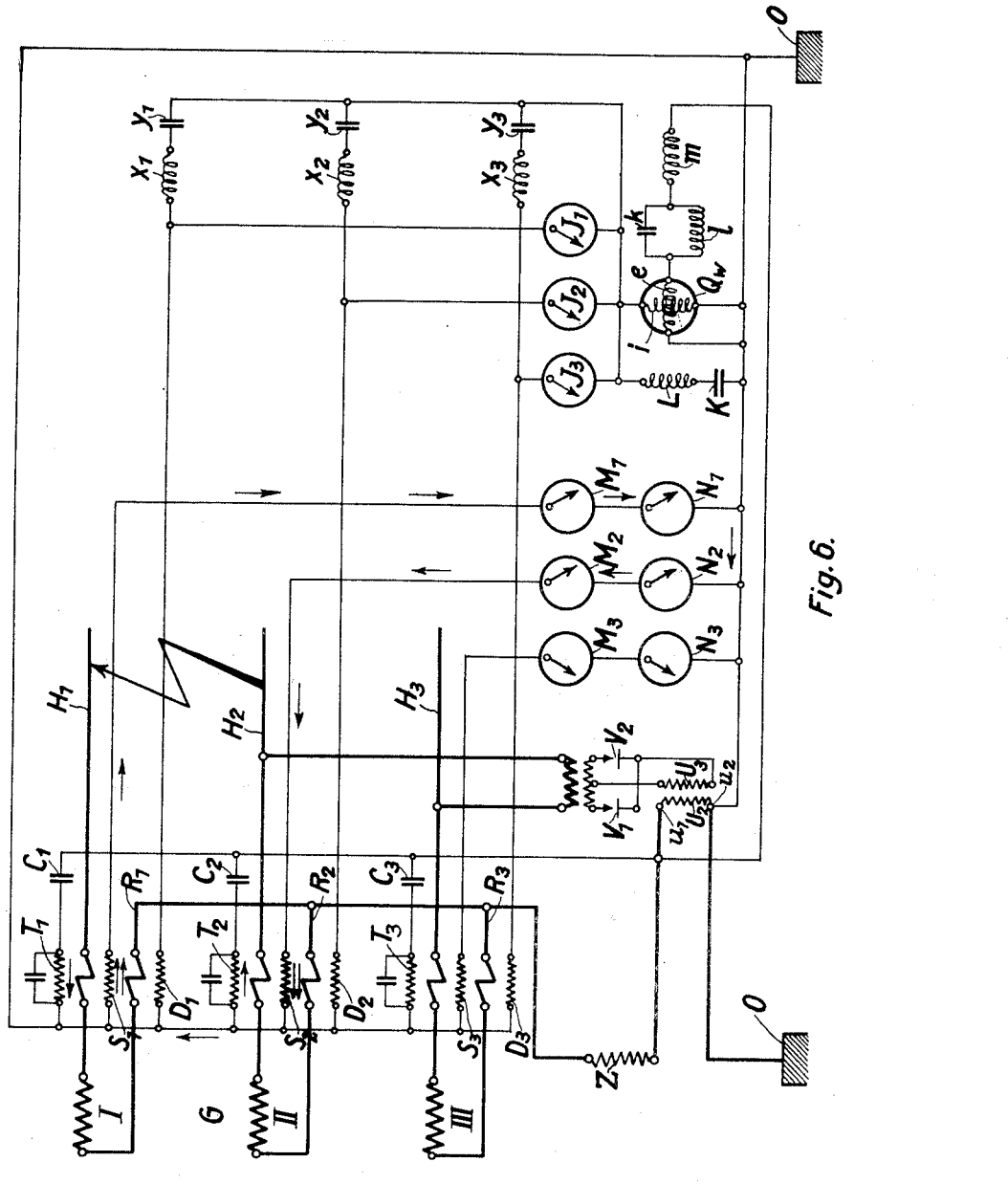
Figs. 6 to 8 are diagrams showing various kinds of trouble in a plant, as follows.

Referring first to Fig. 6, the short-circuit occurs between the conductors H1 and H2, as indicated by the zig-zag arrow, involving the phases I and II of the generator G. The flow of the current having system frequency which is set up by the short-circuit in the primary and integrating windings S1 and S2, is indicated by arrows. The current flows through maximum relays M1 and M2, and through current indicators N1 and N2, which respond. The current does not interfere with the symmetry of the transformers, through whose primaries it flows in opposite directions, as the difference of the primary currents is zero. Electromotive force is not generated in the differential windings D1 and D2, nor is such force present in the winding D3, as phase III is not influenced in any way by the defects in the conductors H1 and H2. Current does not flow through the differential relays J1, J2 and J3. The auxiliary generator U causes a current to flow through coil $e$ of wattmetric relay Qw which is of other frequency than the current flowing in the system. A very weak current, also of different frequency, flows from $u1$ to $u2$ through C1 and T1, C2 and T2, C3 and T3. This current may produce a very small electromotive force in the differential coils D1, D2 and D3 which is of different frequency, and quite weak currents may flow through the resonance circuits $x1$, $y1$, $x2$, $y2$, or $x3$, $y3$, but their geometric sum is nil and therefore current does not flow through the coil $i$ of the relay Qw so that this wattmetric relay, like differential relay, does not respond upon a short-circuit of two system conductors.

Figure 7:
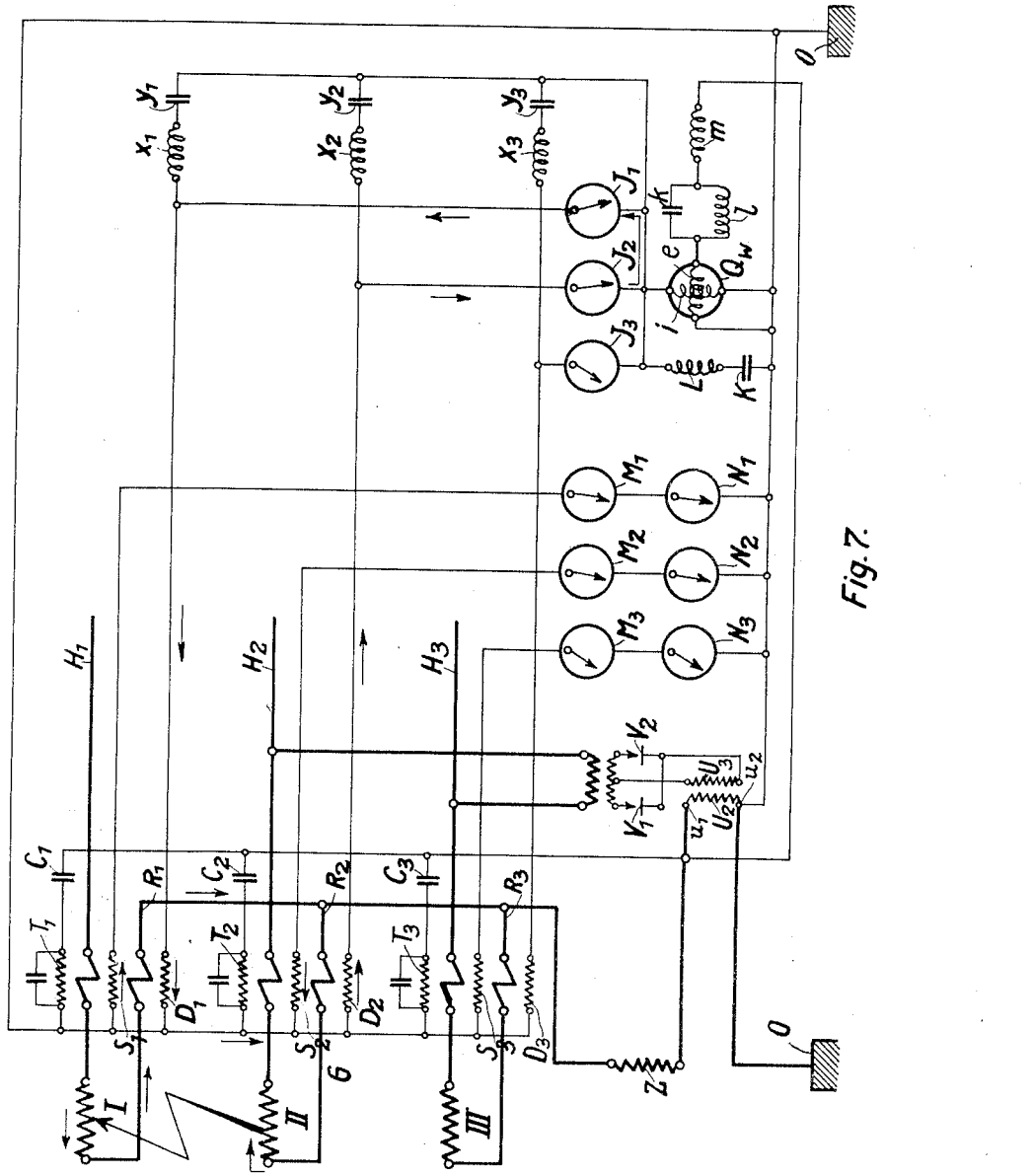

Referring now to Fig. 7, the short-circuit here occurs in the generator G between phase windings I and II, as indicated by the zig-zag arrow. Unsymmetry current now flows through the transformers of phases I and II, as indicated by the arrows, and generates equal electromotive forces of equal direction in the differential windings D1 and D2. The current flows through differential relays J1 and J2, as indicated by the arrows. Through the fault current which is now generated, the sum of the primary currents in the transformers of phases I and II may become somewhat higher than the sum in the primaries of phase III, as indicated by the indicators in the maximum relays M1, M2 and in the meters N1, N2. However, the excess currents are so weak that the relays M1 and M2 do not respond as they do in the case of overload, Fig. 6. In the present case, the fault current does not overload the generator G. In the relay Qw, conditions are the same as in Fig. 6, no current flowing in the coil $i$, and the relay does not respond.

Figure 8:
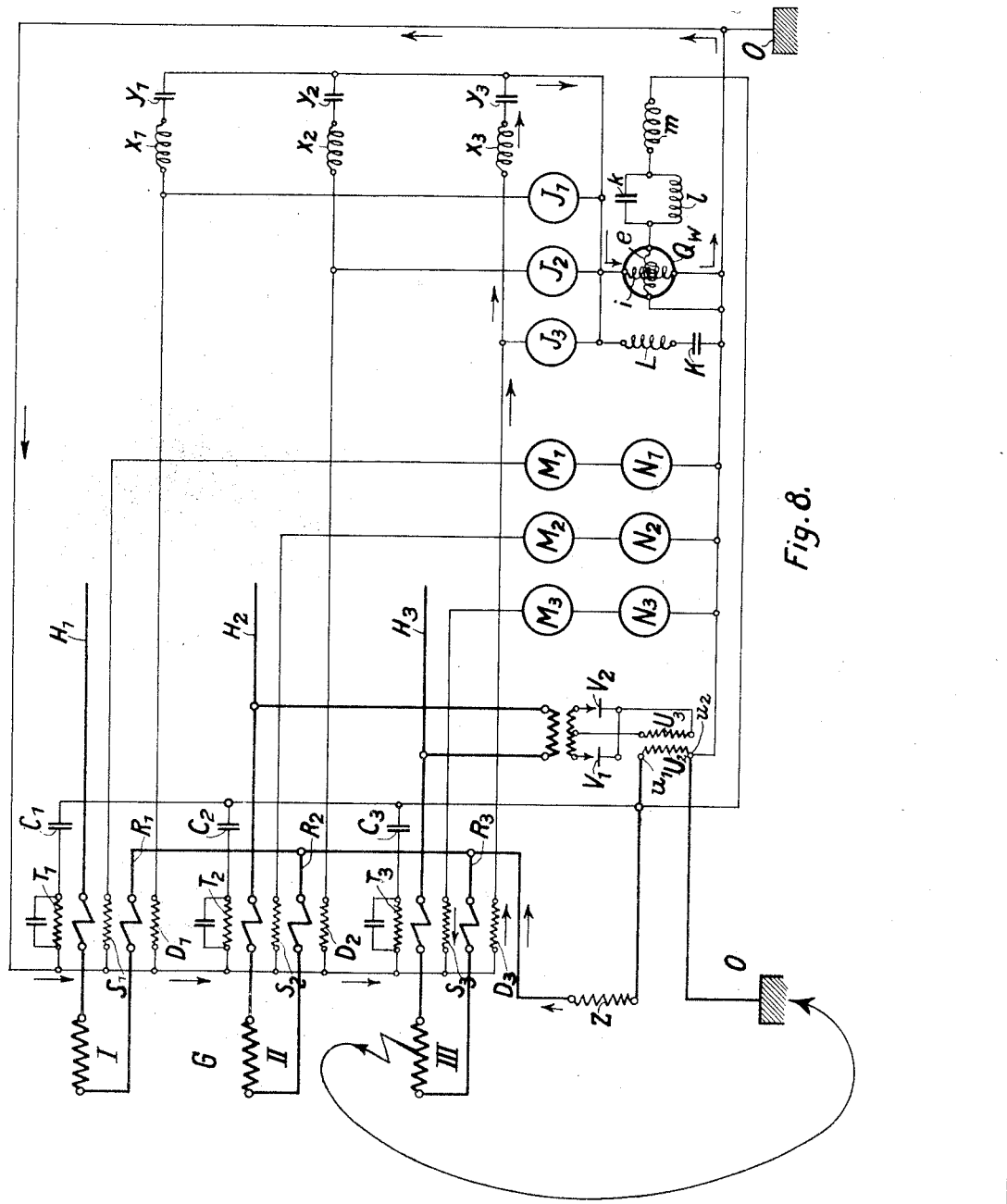

Referring now to Fig. 8, a winding III of generator G has an earth, as indicated by the zig-zag arrow. This case has already been referred to in the description of Fig. 4, above. The electromotive force which is generated in the differential winding D3 causes current to flow in the direction of the arrows in Fig. 8, through the resonance circuit $x3$, $y3$ and the coil $i$ of relay Qw which now responds as both its coils are excited. The unsymmetry current of other frequency obviously does not load the generator G, and the maximum relays M do not respond. Only quite a small portion of the current of other frequency from the differential winding D3 flows through the differential relay J3, for the resistance of this relay, related to the other frequency, is very high as compared with the very small resistance of the resonance circuit $x3$, $y3$ which circuit is tuned to the other frequency and shunted to the exciter coil of the differential relay J3, which cannot respond when the phase winding III is earthed as shown. The same applies to the differential relays allotted to phase windings I and II. Differential relays will not respond but the earthing relay will respond if currents of other than system frequency are present Current of system frequency from the differential winding belonging to the damaged phase III is too small to cause a differential relay to respond, on account of the weakness of the earth current of normal system frequency which flows through the fault.

I claim:

1. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an earthing relay both connected in series to the differential winding of said integrating and differential transformer, a ground connection for said earthing relay and for said series connections, and means connected in series to said impedance and earth for generating an auxiliary current of a frequency other than the normal frequency of said system.

2. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an earthing relay both connected in series to the differential winding of said integrating and differential transformer, a ground connection for said earthing relay and for said series connections, means connected in series to said impedance and earth for generating an auxiliary current of a frequency other than the normal frequency of said system, a resonance circuit tuned to the normal frequency of said system and connected in parallel to said earthing relay, and another resonance circuit tuned to the frequency of the auxiliary current and connected in parallel to said differential relay.

3. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an earthing relay both connected in series to the differential winding of said integrating and differential transformer, a ground connection for said earthing relay and for said series connections, means connected in series to said impedance and earth for generating an aux-iliary current of a frequency other than the normal frequency of said system, a third winding on said integrating and differential transformer, and a condenser connected to said third winding.

4. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an earthing relay both connected in series to the differential winding of said integrating and differential transformer, a ground connection for said earthing relay and for said series connections, means connected in series to said impedance and earth for generating an auxiliary current of a frequency other than the normal frequency of said system, a third winding on said integrating and differential transformer, a primary oscillation circuit connected to said third winding, and a secondary oscillation circuit coupled with said primary oscillation circuit, said two oscillation circuits being tuned to the frequency of said auxiliary current.

5. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an earthing relay both connected in series to the differential winding of said integrating and differential transformer, a ground connection for said earthing relay and for said series connections, means connected in series to said impedance and earth for generating an auxiliary current of a frequency other than the normal frequency of said system, and means for compensating the influence of the earth capacity of said appliance and connected to a winding of said integrating and differential transformer.

6. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and an amperemetric earthing relay both connected in series to the differential winding of said integrating and differential transformer, a ground connection for said earthing relay and for said series connections, and means connected in series to said impedance and earth for generating an auxiliary current of a frequency other than the normal frequency of said system.

7. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and the current coil of a wattmetric earthing relay, said differential relay and said current coil being connected in series to the differential winding of said integrating and differential transformer, a ground connection for said earthing relay and for said series connections, and means connected in series to said impedance and earth for generating an auxiliary current of a frequency other than the normal frequency of said system, the voltage coil of said wattmetric earthing relay being connected to said means for generating said auxiliary current.

8. In an electric plant having an appliance to be protected against short circuits in the system, short circuits in the appliance to be protected and earths in the appliance to be protected, comprising a system to which said appliance is connected, an integrating and differential transformer in the connection of said appliance to said system, quenching means for earthing currents connected to said system, an impedance connecting one of the primaries of each phase of said integrating and differential transformer to earth; a maximum relay connected to the integrating winding of said integrating and differential transformer, a ground connection for said maximum relay, a differential relay and the current coil of a wattmetric earthing relay, said differential relay and said current coil being connected in series to the differential winding of said integrating and differential transformer, a ground connection for said earthing relay and for said series connections, means connected in series to said impedance and earth for generating an auxiliary current of a frequency other than the normal frequency of said system, the voltage coil of said wattmetric earthing relay being connected to said means for generating said auxiliary current, and a phase regulating device connected in series with said voltage coil of said wattmetric earthing relay.

WALTER BÜTOW.